Patented Aug. 18, 1931

1,819,647

UNITED STATES PATENT OFFICE

EVELYN WILLIAM MADGE, OF ERDINGTON, BIRMINGHAM, ENGLAND, ASSIGNOR TO DUNLOP RUBBER COMPANY, LIMITED, A BRITISH COMPANY

MANUFACTURE OF GOODS OF RUBBER OR SIMILAR MATERIAL

No Drawing. Application filed December 23, 1930, Serial No. 504,277, and in Great Britain December 20, 1929.

This invention comprises improvements in or relating to the manufacture of microporous goods of rubber or similar material.

The object of the invention is to produce a porous or micro-porous articles of vulcanized rubber or the like, more particularly battery separators or filtering cones free from the above disadvantages.

According to the invention masses of rubber containing dispersed microscopic particles of water are obtained by electrolysis of a rubber dispersion without the addition of electrolytes and are vulcanized under such conditions that evaporation of the liquid contained in the pores or micro-pores is prevented.

The conditions of the dispersion acted on and of the electrolysis are such as to produce as to contain desired amounts of the dispersion medium substantially uniformly distributed in the pores, capillaries or cells of microscopic or ultra-microscopic dimensions of the structure of the solids produced.

The products so formed are strong, homogeneous, irreversible solid structures without pores visible to the naked eye.

The amount of dispersion medium included in the pores is governed to some extent by the concentration of the latex mixing before electrolysis but more particularly by the alkalinity and conductively of the latex mixing.

If the subsequent vulcanization of the products obtained is carried out in such manner as to prevent the escape of the dispersion medium included in their structure porous or micro-porous articles are obtained.

The emulsions or dispersions comprise by way of example, those consisting of or containing rubber, gutta-percha, balata, or similar vegetable resins occurring naturally or artificially obtained.

Aqueous dispersions of coagulated rubber, vulcanized rubber, synthetic rubber, waste or reclaim, may also be employed if desired as alternatives or admixtures.

Any of the aforesaid dispersions may contain the usual known compounding ingredients and/or may be in concentrated form.

Concentrates such as are obtained in applications Serial Nos. 232,705 filed November 11, 1927, and 727,530 filed July 22, 1924, to which may be added any one or more of the usual compounding ingredients may also be used.

Such dispersions, whether of natural or artificial origin or of rubber or other material of similar nature, whether concentrated or not, together with any compounding ingredients, are hereinafter generically termed rubber materials.

According to the present invention the admixture of electrolytes which tend to produce gelling of the aqueous emulsions or dispersions aforesaid in the cold or by the application of heat is excluded.

The following examples illustrate how the process can be effected for the production of micro-porous ebonite.

Example 1

A rubber deposit can be prepared by electro-deposition from a mixing of the following composition:—

| | Parts by weight |
|---|---|
| Rubber | 100 |
| Sulphur | 50 |
| Zinc oxide | 1 |
| Zinc diethyldithio-carbamate | 1 |
| Transformer oil | 10 |
| Lamp black | 2 |

The compounding ingredients are added to the latex in the form of suitable dispersions. The alkalinity and conductivity of the mixing are adjusted to give a moisture content of deposit desired as these two factors are the major factors in governing the wetness of the deposit. With such a mix and employing zinc anodes coagulated deposits are obtained with a current density of 0.6 amps. per sq. decimetre. The firmly coagulated electrophoretically obtained deposit while still in the wet condition and containing approximately 50% of moisture can either be transferred to a mould or cured direct on the depositing mandrel or on any other former under water or steam. The water or steam provides an aqueous or saturated medium into which water does not evaporate.

Having now particularly described and ascertained the nature of my said invention and in what manner the same is to be performed, I declare that what I claim is:—

1. A process for the manufacture of porous or micro-porous articles of vulcanized rubber from aqueous dispersions without the use of electrolytes or gelling which comprises separating the dispersed rubber material from a dispersing medium by electrophoresis and vulcanizing said deposit while preventing the evaporation of liquid from the pores therein.

2. A process of forming porous or microporous articles from aqueous dispersions of rubber material without gelling electrolytes which comprises separating dispersed rubber material from an aqueous dispersive agent electrophoretically, molding said rubber deposit to a desired form without drying, and vulcanizing said formed material while preventing the evaporation of water from the pores thereof.

3. A process for the manufacture of porous or micro-porous articles of vulcanized rubber material without gelling electrolytes which comprises depositing dispersed rubber material from an aqueous dispersion thereof in a desired form, and vulcanizing said deposit thus formed while preventing the evaporation of water from the pores thereof.

4. A process of manufacturing porous or micro-porous articles of vulcanized rubber from aqueous dispersions thereof without gelling electrolytes which comprises depositing rubber material from an aqueous dispersion thereof, and vulcanizing said deposit under water and at a pressure sufficient to prevent evaporation of water from the pores thereof.

5. A process of manufacturing porous or micro-porous articles of vulcanized rubber from acqueous dispersions thereof which comprises forming a deposit of rubber material containing moisture in gel-like form by electrophoresis, and vulcanizing said deposit in a medium which prevents the evaporation of said water from said deposit.

6. A method of forming porous or microporous articles of rubber composition which comprises electrophoretically depositing rubber material from an aqueous dispersion thereof and controlling the alkalinity and conductivity of the dispersion to obtain a deposit of gel-like structure enclosing a desired quantity of the dispersion medium, and vulcanizing said deposit without loss of water therefrom.

In witness whereof, I have hereunto signed my name.

EVELYN WILLIAM MADGE.